(12) United States Patent
Su et al.

(10) Patent No.: US 12,224,538 B2
(45) Date of Patent: *Feb. 11, 2025

(54) BUS BAR ASSEMBLY

(71) Applicant: Delta Electronics, Inc., Taoyuan (TW)

(72) Inventors: Chen-Chiang Su, Taoyuan (TW); Ching-Tang Chang, Taoyuan (TW); Chi-Shou Ho, Taoyuan (TW); Guan-Chen Yin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,777

(22) Filed: Feb. 1, 2024

(65) Prior Publication Data

US 2024/0170898 A1 May 23, 2024

Related U.S. Application Data

(63) Continuation of application No. 17/586,775, filed on Jan. 27, 2022, now Pat. No. 12,119,596.

(60) Provisional application No. 63/197,847, filed on Jun. 7, 2021.

(30) Foreign Application Priority Data

Sep. 3, 2021 (CN) .......................... 202122114905.X

(51) Int. Cl.
*H01R 25/16* (2006.01)
*H02B 1/20* (2006.01)

(52) U.S. Cl.
CPC ............. *H01R 25/162* (2013.01); *H02B 1/20* (2013.01)

(58) Field of Classification Search
CPC .... H01R 25/162; H01R 25/161; H01R 25/16; H02B 1/20; H02B 1/21
See application file for complete search history.

(56) References Cited

U.S. PATENT DOCUMENTS

| | | | |
|---|---|---|---|
| 1,004,555 A | 10/1911 | Brooks | |
| 3,732,523 A * | 5/1973 | Fouse | H02G 5/08 174/71 B |
| 3,956,574 A * | 5/1976 | Weimer | H02G 5/06 174/68.2 |
| D253,887 S | 1/1980 | Turner et al. | |

(Continued)

FOREIGN PATENT DOCUMENTS

| | | |
|---|---|---|
| CN | 1748275 A | 3/2006 |
| CN | 111009758 B | 7/2021 |

(Continued)

*Primary Examiner* — Harshad C Patel
(74) *Attorney, Agent, or Firm* — KIRTON McCONKIE; Evan R. Witt

(57) ABSTRACT

A bus bar assembly is provided and includes a first linking bus bar, a second linking bus bar and plural power connectors. The first linking bus bar includes a first main bar, a first bending part and a first conducting part. The first bending part connects between the first main bar and the first conducting part. The second linking bus bar is disposed corresponding to and isolated from the first linking bus bar, and includes a second main bar, a second bending part and a third conducting part. The second bending part connects between the second main bar and the third conducting part. The power connectors are electrically coupled with the first main bar and the second main bar, respectively.

17 Claims, 11 Drawing Sheets

(56) References Cited

U.S. PATENT DOCUMENTS

| | | | |
|---|---|---|---|
| 4,270,019 A | 5/1981 | Thye et al. | |
| 5,011,417 A * | 4/1991 | Matsumoto | H05K 7/026 |
| | | | 439/76.2 |
| 5,160,274 A * | 11/1992 | Ozaki | H01R 9/2458 |
| | | | 439/724 |
| 5,618,186 A * | 4/1997 | Saka | H01R 25/165 |
| | | | 439/948 |
| 6,238,225 B1 * | 5/2001 | Middlehurst | G06F 13/409 |
| | | | 439/721 |
| 6,325,640 B1 * | 12/2001 | Kasai | H01R 25/168 |
| | | | 439/949 |
| D463,778 S | 10/2002 | Hsu et al. | |
| 6,519,817 B1 | 2/2003 | Lenhart et al. | |
| 6,603,075 B1 * | 8/2003 | Soares | H02B 1/21 |
| | | | 174/70 B |
| D582,861 S | 12/2008 | Honma et al. | |
| 7,485,015 B2 * | 2/2009 | Coffy | H01R 4/485 |
| | | | 439/828 |
| D640,635 S | 6/2011 | Ngo | |
| 9,004,926 B2 * | 4/2015 | Ozawa | H01H 85/2035 |
| | | | 439/76.2 |
| 9,166,309 B1 * | 10/2015 | Costello | H01R 9/2675 |
| D760,655 S | 7/2016 | Murphy et al. | |
| D760,656 S | 7/2016 | Murphy et al. | |
| 9,728,895 B2 | 8/2017 | Yanli | |
| 9,954,293 B2 * | 4/2018 | Xu | H05K 3/325 |
| 10,361,525 B2 * | 7/2019 | Li | H01R 31/005 |
| 10,404,041 B2 * | 9/2019 | Huang | H02G 5/025 |
| D867,300 S | 11/2019 | Huang | |
| 10,749,301 B2 * | 8/2020 | Matsui | H01R 13/506 |
| 10,951,013 B2 * | 3/2021 | Huang | H02J 3/06 |
| 2002/0098743 A1 | 7/2002 | Schell et al. | |
| 2014/0099806 A1 | 4/2014 | Ehlen et al. | |
| 2014/0370339 A1 | 12/2014 | Kim et al. | |
| 2015/0214583 A1 * | 7/2015 | Lim | H01M 10/486 |
| | | | 429/90 |
| 2018/0048127 A1 | 2/2018 | Liang et al. | |
| 2018/0076586 A1 * | 3/2018 | Rangi | H01R 13/639 |
| 2022/0014005 A1 | 1/2022 | Luo et al. | |
| 2022/0385014 A1 * | 12/2022 | Hatol | H01R 25/162 |
| 2022/0393414 A1 * | 12/2022 | Su | H02B 1/20 |
| 2023/0066965 A1 | 3/2023 | Yu | |

FOREIGN PATENT DOCUMENTS

| | | |
|---|---|---|
| TW | M567897 U | 10/2018 |
| TW | M568539 U | 10/2018 |
| TW | D196094 S | 2/2019 |
| TW | 201913281 A | 4/2019 |
| TW | 202203525 A | 1/2022 |
| TW | 202207538 A | 2/2022 |
| TW | D221357 S | 10/2022 |

\* cited by examiner

BUS BAR ASSEMBLY

CROSS-REFERENCE TO RELATED APPLICATION

This application is a Continuation Application of U.S. patent application Ser. No. 17/586,775 filed on Jan. 27, 2022 and entitled "BUS BAR ASSEMBLY", which claims the benefit of U.S. Provisional Application No. 63/197,847 filed on Jun. 7, 2021 and claims priority to China Patent Application No. 202122114905.X filed on Sep. 3, 2021. The entire contents of the above-mentioned patent applications are incorporated herein by reference for all purposes.

FIELD OF THE INVENTION

The present disclosure relates to a power connection element, and more particularly to a bus bar assembly.

BACKGROUND OF THE INVENTION

Generally, a bus bar assembly is commonly used in a rack bus bar and configured for electrically coupling output terminals of one or plural power supply units to the rack bus bar, so as to distribute power supplied by one or plural power supply units to electronic equipment through the rack bus bar of the server rack.

FIG. 1A is a schematic view showing a bus bar assembly of a prior art, and FIG. 1B is a schematic view showing a metal plate of a linking bus bar of the bus bar assembly of FIG. 1A. As shown in FIG. 1A and FIG. 1B, the bus bar assembly 100 includes two linking bus bars 101 and a plurality of power connectors 102. Each of the linking bus bar 101 includes a main bar 101a and an output part 101b. In order to reduce contact resistance and increase efficiency, the main bar 101a and the output part 101b of the linking bus bar 101 are formed by removing the waste material B according to a specific pattern from the metal plate A shown in FIG. 1B, and then the output part 101b is bended to be perpendicular to the main bar 101a, so that the linking bus bar 101 is formed. However, as shown in FIG. 1B, the volume of the waste material B is about 46% of the volume of the metal plate A, and the proportion of the waste material B is high, and the amount of the waste material B is also large.

In order to avoid the generation of waste material, the main bar and the output part of another conventional linking bus bar are assembled to fix with each other, by for example screws. However, the conventional linking bus bar fixed by assembly has higher contact impedance and lower power transmission efficiency. Moreover, the conventional bus bar assembly usually has only one power outputting path, which can only transmit the power supplied by the power supply unit to the output part of the bus bar assembly, and cannot provide the input path or the output path for the backup power at the same time. Consequently, the conventional bus bar assembly has a low degree of freedom in assembly application. On the other hand, the conventional bus bar assembly usually do not have a detection device for detecting temperature abnormalities or voltage abnormalities. If temperature abnormalities or voltage abnormalities occur in the bus bar assembly or the cabinet bus bar, an inspection or maintenance cannot be performed immediately and effectively, and may even lead to the risk of power supply interruption.

Therefore, there is a need of providing a bus bar assembly to obviate the drawbacks encountered from the prior arts.

SUMMARY OF THE INVENTION

It is an object of the present disclosure to provide a bus bar assembly for reducing the contact impedance, enhancing the power transmission efficiency and reducing the amount of waste material. The bus bar assembly includes a sensor for effectively and immediately detecting whether the system is operating normally or not. In addition, a plurality of second conducting parts and a plurality of fourth conducting parts of the bus bar assembly further provide additional power transmission paths, so that the additional space for configuring the battery connection paths is saved, and the cost is reduced.

In accordance with an aspect of the present disclosure, there is provided a bus bar assembly. The bus bar assembly includes a first linking bus bar, a second linking bus bar and a plurality of power connectors. The first linking bus bar includes a first main bar, a first bending part and a first conducting part. The first main bar has a first main bar side and a second main bar side which are opposite to each other. The first bending part is in connection between the second main bar side of the first main bar and the first conducting part. The first main bar, the first bending part and the first conducting part are formed by bending from each other. The second linking bus bar is disposed corresponding to and isolated from the first linking bus bar, and includes a second main bar, a second bending part and a third conducting part. The second main bar has a third main bar side and a fourth main bar side which are opposite to each other. The second bending part is in connection between the fourth main bar side of the second main bar and the third conducting part. The second main bar, the second bending part and the third conducting part are formed by bending from each other. The plurality of power connectors are electrically coupled with the first main bar and the second main bar, respectively.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
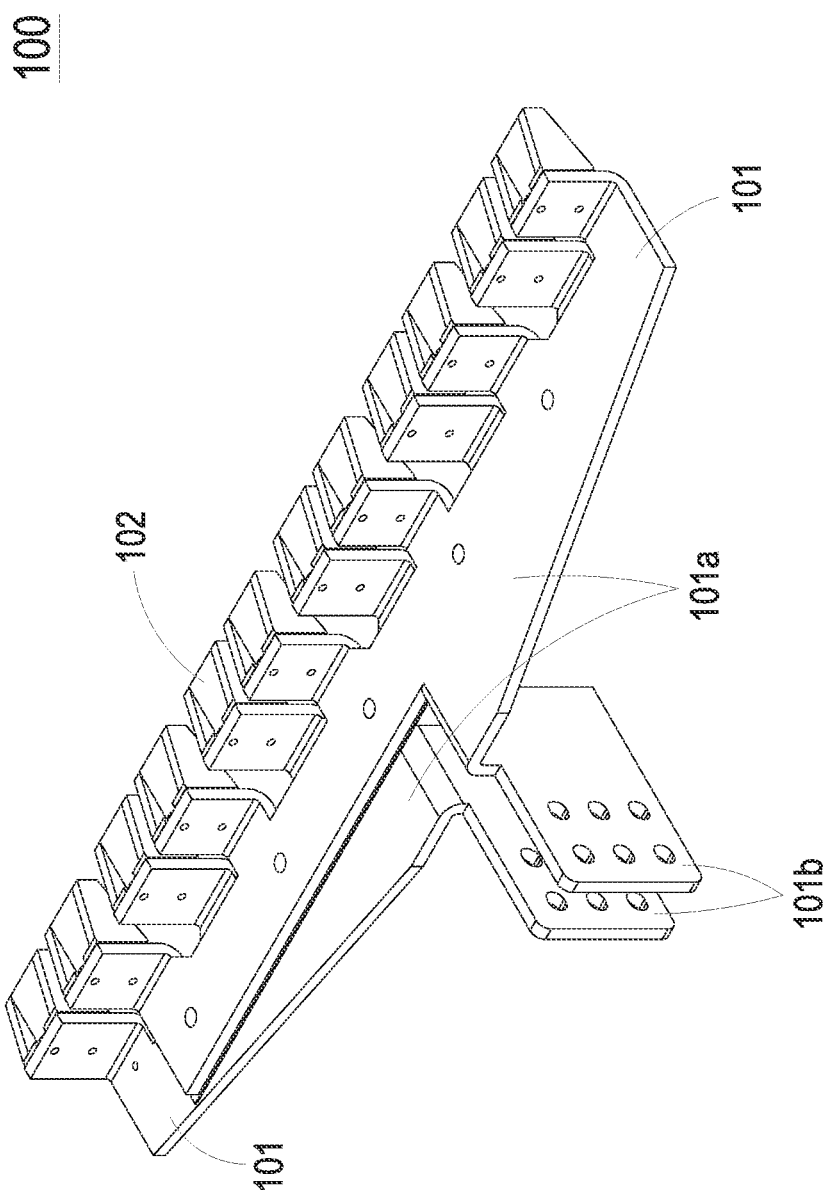
FIG. 1A is a schematic view showing a bus bar assembly of a prior art.
Figure 1B:
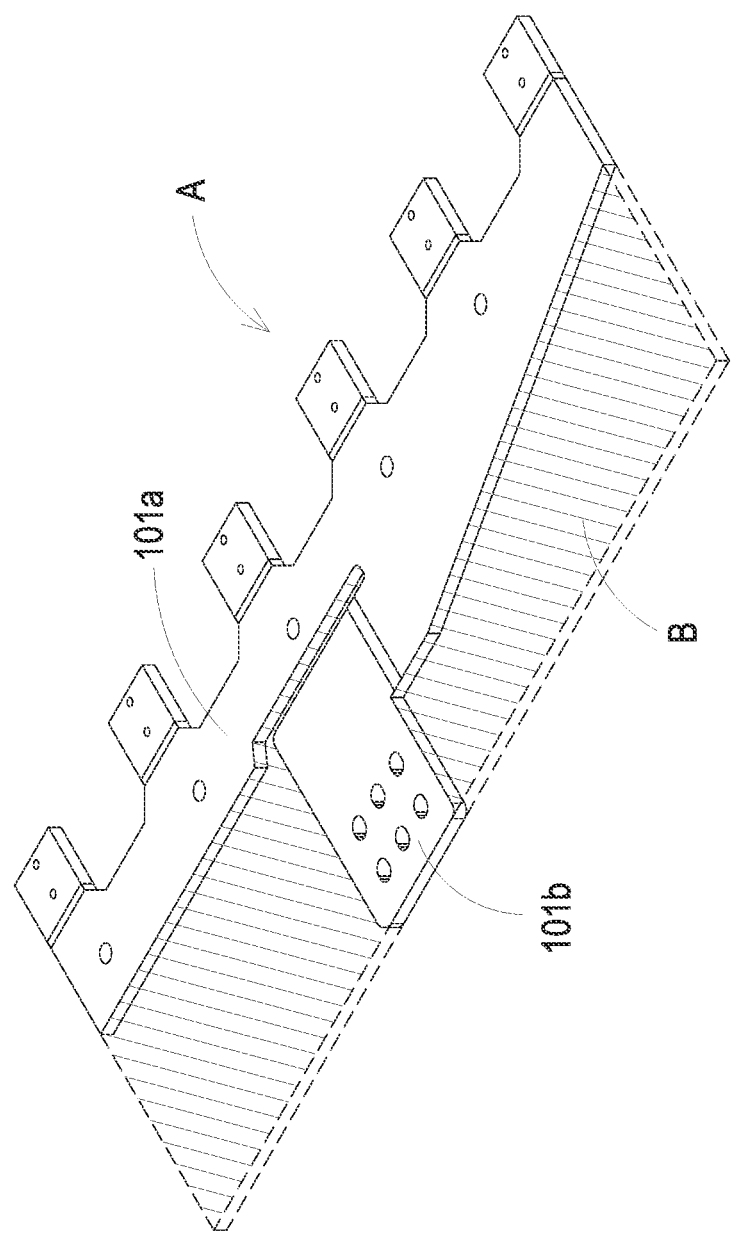
FIG. 1B is a schematic view showing a metal plate of a linking bus bar of the bus bar assembly of FIG. 1A.
Figure 2:
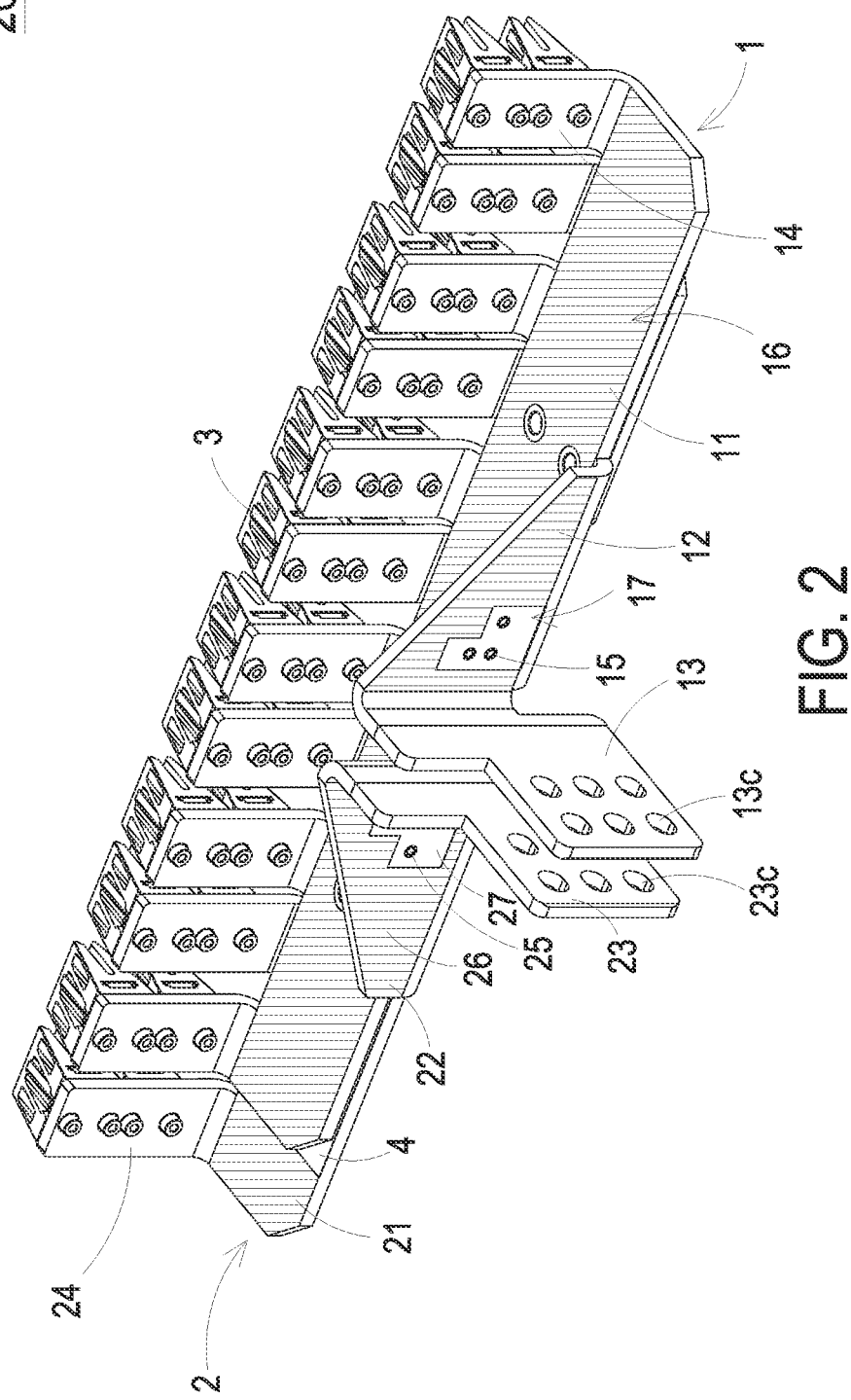
FIG. 2 is a schematic view showing a bus bar assembly according to an embodiment of the present disclosure.
Figure 3:
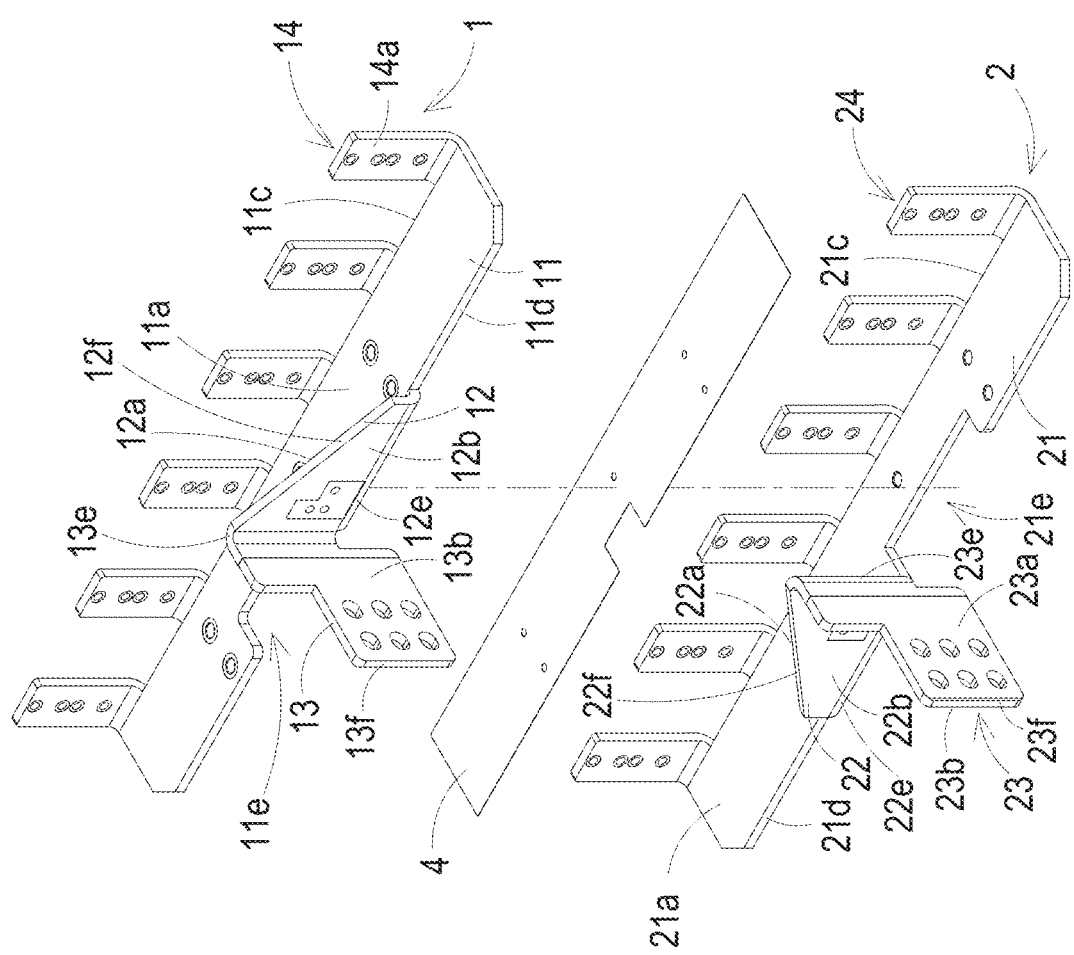
FIG. 3 is an explored view showing a first linking bus bar, a second linking bus bar and an insulation member of the bus bar assembly of FIG. 2.

FIG. 2 is a schematic view showing a bus bar assembly according to an embodiment of the present disclosure, and FIG. 3 is an explored view showing a first linking bus bar, a second linking bus bar and an insulation member of the bus bar assembly of FIG. 2. As shown in FIGS. 2 and 3, the bus bar assembly 200 of the present disclosure includes a first linking bus bar 1, a second linking bus bar 2 and a plurality of power connectors 3. The first linking bus bar 1 includes a first main bar 11, a first bending part 12, a first conducting part 13 and a plurality of second conducting parts 14. The plurality of second conducting parts 14 are in connection with a first main bar side 11c of the first main bar 11, respectively. The first bending part 12 is in connection between a second main bar side 11d of the first main bar 11 and the first conducting part 13. The first main bar side 11c and the second main bar side 11d are two opposite sides of the first main bar 11. The second linking bus bar 2 and the first linking bus bar 1 are disposed corresponding to and isolated from each other. The second linking bus bar 2 includes a second main bar 21, a second bending part 22, a third conducting part 23 and a plurality of fourth conducting parts 24. The plurality of fourth conducting parts 24 are in connection with a third main bar side 21c of the second main bar 21, respectively. The second bending part 22 is in connection between a fourth main bar side 21d of the second main bar 21 and the third conducting part 23. The third main bar side 21c and the fourth main bar side 21d are two opposite sides of the second main bar 21. The plurality of power connectors 3 are electrically coupled with the plurality of second conducting parts 14 and the plurality of fourth conducting parts 24.

As shown in FIG. 3, in the embodiment, the bus bar assembly 200 includes an insulation member 4. The insulation member 4 is disposed between the first linking bus bar 1 and the second linking bus bar 2, and configured for insulating the first linking bus bar 1 and the second linking bus bar 2 from each other. The insulation member 4 is for example but not limited to a gasket made of insulation materials.

In the embodiment, the first linking bus bar 1 is integrally formed into one piece structure, and the second linking bus bar 2 is integrally formed into one piece structure, but not limited thereto. The first main bar 11, the first bending part 12 and the first conducting part 13 of the first linking bus bar 1 are disposed perpendicular to each other, but not limited thereto. The second main bar 21, the second bending part 22 and the third conducting part 23 of the second linking bus bar 2 are disposed perpendicular to each other, but not limited thereto. The second linking bus bar 2 is disposed corresponding to and isolated with the first linking bus bar 1, the first main bar 11 is stacked on the second main bar 21 correspondingly, a first bending part surface 12a of the first bending part 12 is coplanar with a third bending part surface 22a of the second bending part 22 (shown in FIG. 3), a second bending part surface 12b of the first bending part 12 is coplanar with a fourth bending part surface 22b of the second bending part 22 (shown in FIG. 3), and the first conducting part 13 is disposed corresponding to and apart from the third conducting part 23, but not limited thereto.

Figure 4:
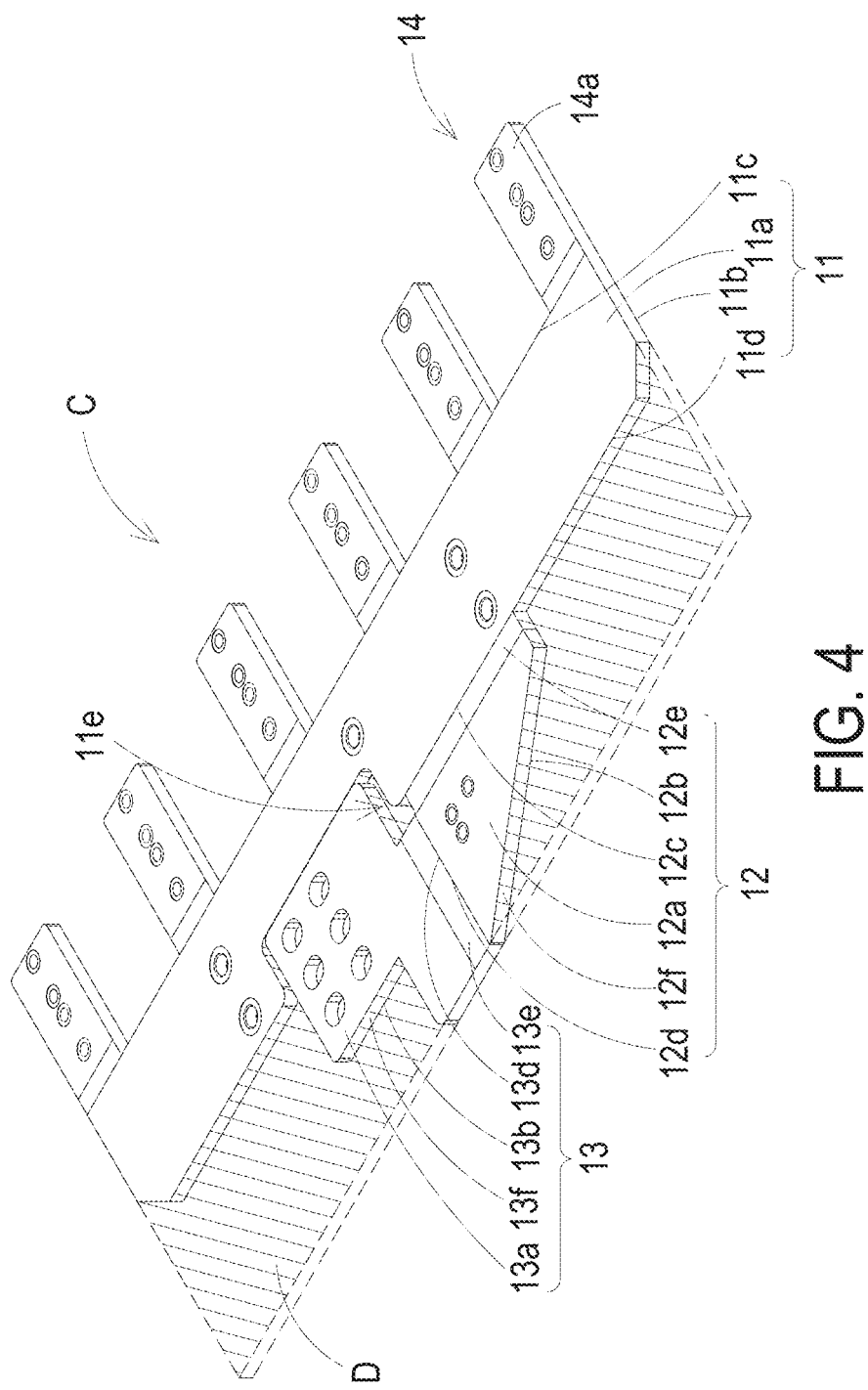
FIG. 4 is a schematic view showing a metal plate of the first linking bus bar of FIG. 3.
Figure 5:
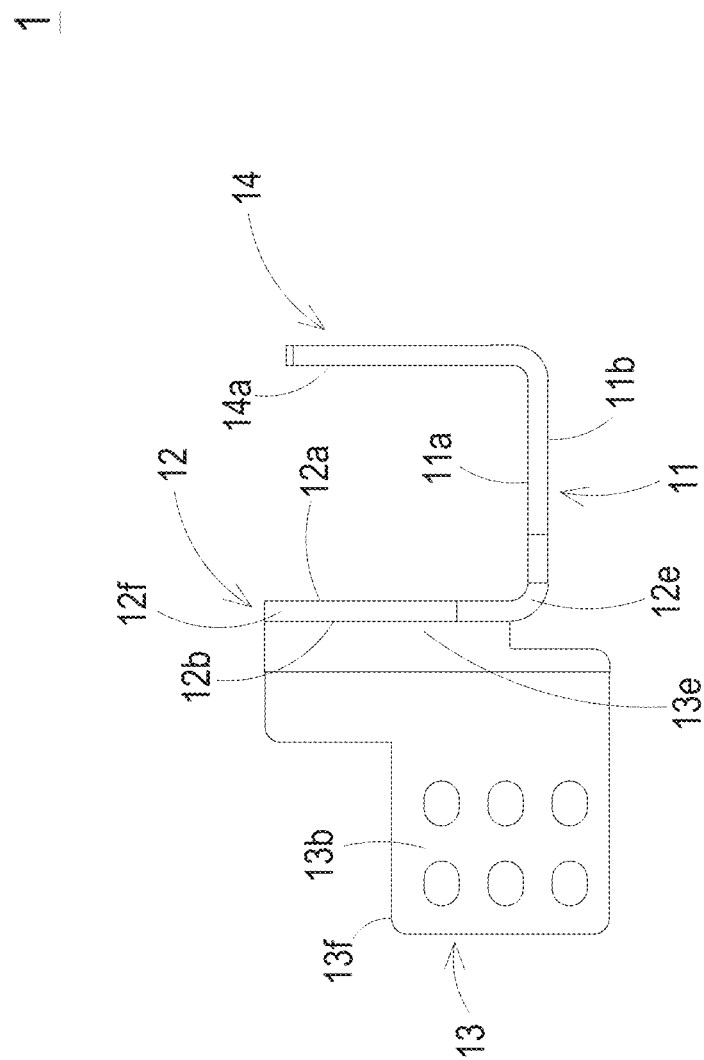
FIG. 5 is a side schematic view showing the first linking bus bar of FIG. 3.

FIG. 4 is a schematic view showing a metal plate of the first linking bus bar of FIG. 3, and FIG. 5 is a side schematic view showing the first linking bus bar of FIG. 3. In the embodiment, the first linking bus bar 1 of the bus bar assembly 200 is formed by removing the waste material D from a metal plate C shown in FIG. 4 according to a specific pattern, so that the first linking bus bar 1 in a plane structure status is formed. Then, by bending the first linking bus bar 1 in the plane structure status, the first main bar 11, the first bending part 12 and the first conducting part 13 are perpendicular to each other to form the first linking bus bar 1, but not limited thereto. As shown in FIG. 4, in the present embodiment, the first main bar 11 of the first linking bus bar 1 has a first main bar side 11c and a second main bar side 11d. The first main bar side 11c and the second main bar side 11d are two opposite sides of the first main bar 11 and disposed corresponding to each other. The first bending part 12 of the first linking bus bar 1 has a first bending part side 12c and a second bending part side 12d. The first bending part side 12c and the second bending part side 12d are two neighboring sides of the first bending part 12. The first bending part 12 includes a first main body 12f and a first connection segment 12e. The first connection segment 12e is in connection between the first main body 12f and the first main bar 11. The first conducting part 13 of the first linking bus bar 1 has a first conducting part side 13d. The first conducting part side 13d is located on one side of the first conducting part 13. The second main bar side 11d of the first main bar 11 is in connection with the first bending part side 12c of the first bending part 12. The second bending part side 12d of the first bending part 12 is in connection with the first conducting part side 13d of the first conducting part 13. The first conducting part 13 includes a second main body 13f and a second connection segment 13e. The second connection segment 13e is in connection between the second main body 13f and the first bending part 12. In an embodiment, the first bending part 12 is a triangular structure, but not limited thereto.

As shown in FIG. 2 to FIG. 5, in the present embodiment, the first main bar 11 of the first linking bus bar 1 has a first main bar surface 11a and a second main bar surface 11b. The first main bar surface 11a is opposite to the second main bar surface 11b. The first bending part 12 of the first linking bus bar 1 has a first bending part surface 12a and a second bending part surface 12b. The first bending part surface 12a is opposite to the second bending part surface 12b. The first conducting part 13 of the first linking bus bar 1 has a first conducting part surface 13a and a second conducting part surface 13b. The first conducting part surface 13a is opposite to the second conducting part surface 13b. The first bending part surface 12a of the first bending part 12 is bended from coplanar with the first main bar surface 11a (shown in FIG. 4) to perpendicular to the first main bar surface 11a (shown in FIGS. 3 and 5), and the first connection segment 12e of the first bending part 12 is a deformed area that in connection between the first main body 12f and the first main bar 11. The second conducting part surface 13b of the first conducting part 13 is bended from coplanar with the second bending part surface 12b (shown in FIG. 4) to perpendicular to the second bending part surface 12b (shown in FIGS. 3 and 5), and the second connection segment 13e of the first conducting part 13 is a deformed area that in connection between the second main body 13f and the first bending part 12. The plurality of second conducting parts 14 have a fifth conducting part surface 14a, respectively. The fifth conducting part surfaces 14a of the plurality of second conducting parts 14 are bended from coplanar with the first main bar surface 11a (shown in FIG. 4) to perpendicular to the first main bar surface 11a (shown in FIGS. 3 and 5), respectively. In the present embodiment, since the first linking bus bar 1 is integrally formed into one piece structure, the contact impedance is reduced, and the power transmission efficiency is enhanced. Moreover, since the first linking bus bar 1 of the present embodiment is one piece structure formed by the above-mentioned bending method, the volume of the waste material D is about 34% of the volume of the metal plate C. By comparing with the bus bar assembly of the prior art, the first linking bus bar 1 of the present embodiment has lower volume of the waste material D, and the advantage of reducing the amount of waste material is achieved.

As shown in FIGS. 3 and 4, in the present embodiment, the first main bar 11 of the first linking bus bar 1 includes a first reclaiming recess 11e. The first reclaiming recess 11e is recessed from the second main bar side 11d toward the first main bar side 11c. When the first linking bus bar 1 is in the plane structure status, the first conducting part 13 is partially accommodated in the first reclaiming recess 11e of the first main bar 11. In other words, the material of the first conducting part 13 is partially taken from the first reclaiming recess 11e of the first main bar 11, so as to avoid taking the material from the direction away from the first main bar 11, and the advantage of reducing the amount of waste material is achieved. The amount of the material of the first reclaiming recess 11e taken by the first conducting part 13 is not limited to the present embodiment and is adjustable according to the practical requirements. In an embodiment, when the first linking bus bar 1 is in the plane structure status, the second main bar side 11d of the first main bar 11 is a continuous side without a recess, and the first conducting part 13 is disposed apart from and neighboring to the second main bar side 11d of the first main bar 11, but not limited thereto.

Figure 6:
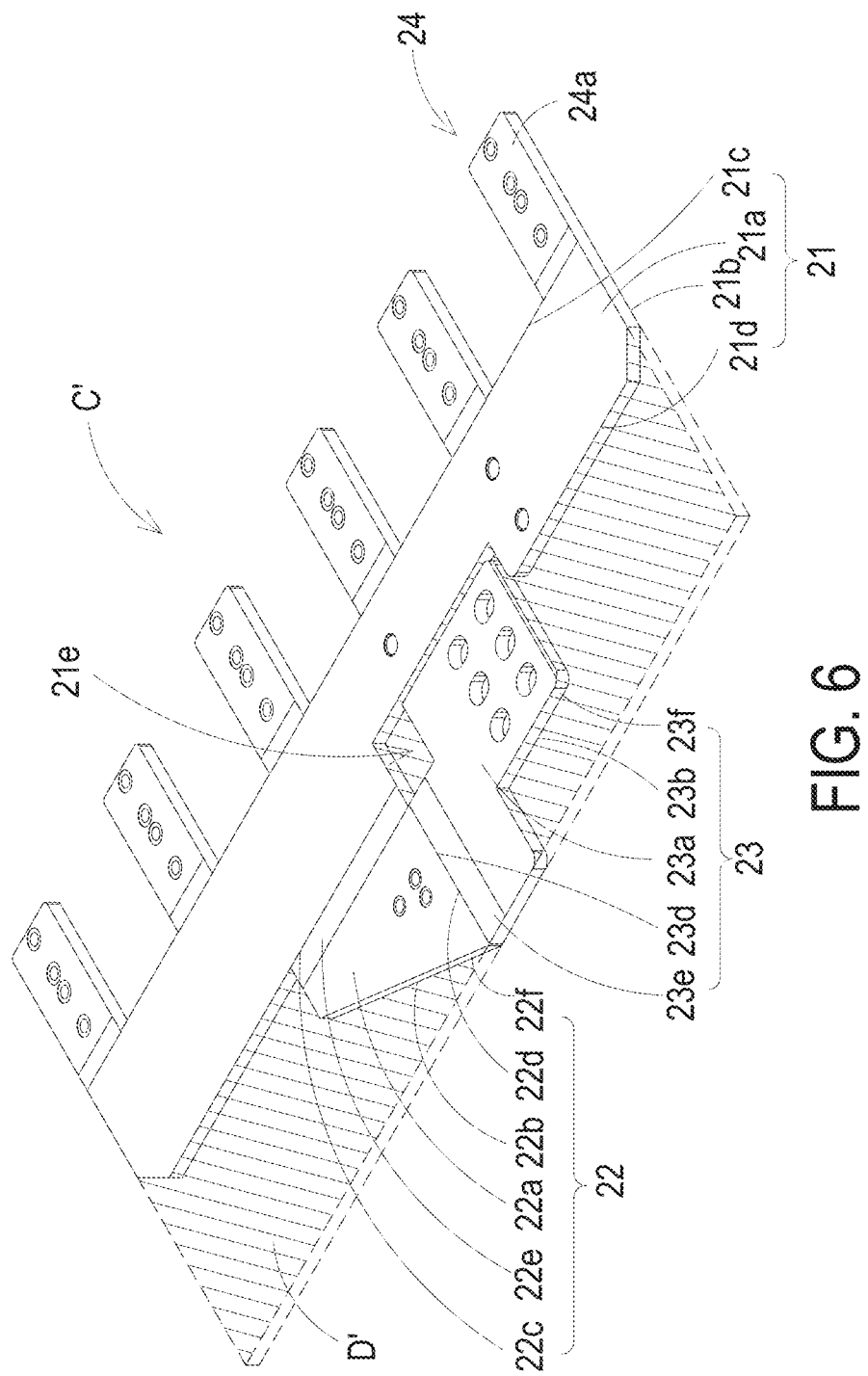
FIG. 6 is a schematic view showing a metal plate of the second linking bus bar of FIG. 3.
Figure 7:
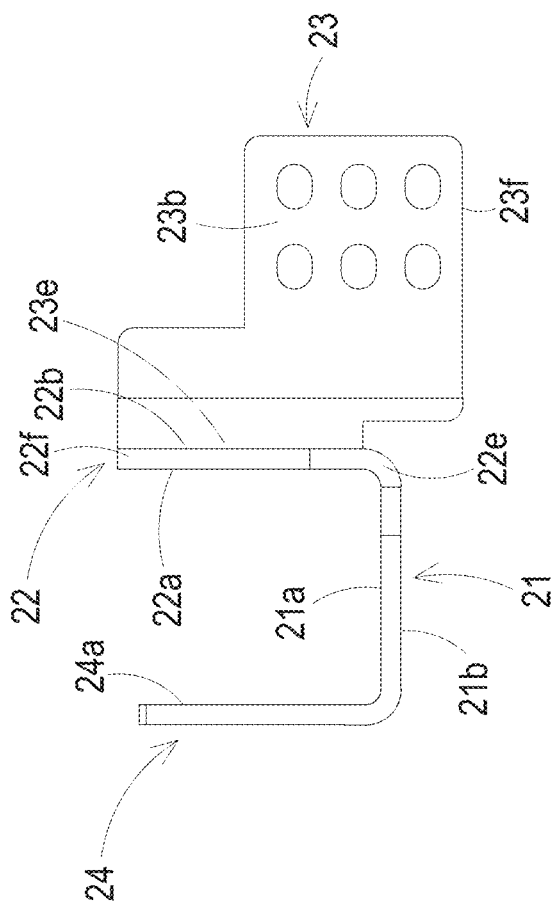
FIG. 7 is a side schematic view showing the second linking bus bar of FIG. 3.

FIG. 6 is a schematic view showing a metal plate of the second linking bus bar of FIG. 3, and FIG. 7 is a side schematic view showing the second linking bus bar of FIG. 3. The second linking bus bar 2 of the bus bar assembly 200 of the present embodiment is formed by removing the waste material D' from a metal plate C' shown in FIG. 6 according to a specific pattern, so that the second linking bus bar 2 in a plane structure status is formed. Then, by bending the second linking bus bar 2 in the plane structure status, the second main bar 21, the second bending part 22 and the third conducting part 23 of the second linking bus bar 2 are perpendicular to each other to form the second linking bus bar 2, but not limited thereto. As shown in FIG. 6, in the present embodiment, the second main bar 21 of the second linking bus bar 2 includes a third main bar side 21c and a fourth main bar side 21d. The third main bar side 21c and the fourth main bar side 21d are two opposite sides of the second main bar 21 and disposed corresponding to each other. The second bending part 22 of the second linking bus bar 2 has a third bending part side 22c and a fourth bending part side 22d. The third bending part side 22c and the fourth bending part side 22d are two neighboring sides of the second bending part 22. The second bending part 22 includes a third main body 22f and a third connection segment 22e. The third connection segment 22e is in connection between the third main body 22f and the second main bar 21. The third conducting part 23 of the second linking bus bar 2 has a second conducting part side 23d. The second conducting part side 23d is located on one side of the third conducting part 23. The fourth main bar side 21d of the second main bar 21 is in connection with the third bending part side 22c of the second bending part 22. The fourth bending part side 22d of the second bending part 22 is in connection with the second conducting part side 23d of the third conducting part 23. The third conducting part 23 includes a fourth main body 23f and a fourth connection segment 23e. The fourth connection segment 23e is in connection between the fourth main body 23f and the second bending part 22. In an embodiment, the second bending part 22 is a triangular structure, but not limited thereto.

As shown in FIGS. 2, 3, 6 and 7, the second main bar 21 of the second linking bus bar 2 has a third main bar surface 21a and a fourth main bar surface 21b. The third main bar surface 21a is opposite to the fourth main bar surface 21b. The second bending part 22 of the second linking bus bar 2 has a third bending part surface 22a and a fourth bending part surface 22b. The third bending part surface 22a is opposite to the fourth bending part surface 22b. The third conducting part 23 of the second linking bus bar 2 has a third conducting part surface 23a and a fourth conducting part surface 23b. The third conducting part surface 23a is opposite to the fourth conducting part surface 23b. The third bending part surface 22a of the second bending part 22 is bended from coplanar with the third main bar surface 21a (shown in FIG. 6) to perpendicular to the third main bar surface 21a (shown in FIGS. 3 and 7), and the third connection segment 22e of the second bending part 22 is a deformed area that in connection between the third main body 22f and the second main bar 21. The fourth conducting part surface 23b of the third conducting part 23 is bended from coplanar with the fourth bending part surface 22b (shown in FIG. 6) to perpendicular to the fourth bending part surface 22b (shown in FIGS. 3 and 7), and the fourth connection segment 23e of the third conducting part 23 is a deformed area that in connection between the fourth main body 23f and the second bending part 22. The plurality of fourth conducting parts 24 have a sixth conducting part surface 24a, respectively. The sixth conducting part surfaces 24a of the plurality of fourth conducting part 24 are bended from coplanar with the third main bar surface 21a (shown in FIG. 6) to perpendicular to the third main bar surface 21a (shown in FIGS. 3 and 7), respectively. In the present embodiment, since the second linking bus bar 2 is integrally formed into one piece structure, the contact impedance is reduced, and the power transmission efficiency is enhanced. Moreover, since the second linking bus bar 2 of the present embodiment is one piece structure formed by the above-mentioned bending method, the volume of the waste material D' is for about 34% of the volume of the metal plate C'. By comparing with the bus bar assembly of the prior art, the second linking bus bar 2 of the present embodiment has lower volume of the waste material D', and the advantage of reducing the amount of waste material is achieved.

As shown in FIGS. 3 and 6, in the present embodiment, the second main bar 21 of the second linking bus bar 2 includes a second reclaiming recess 21e. The second reclaiming recess 21e is recessed from the fourth main bar side 21d toward the third main bar side 21c. When the second linking bus bar 2 is in the plane structure status, the third conducting part 23 is partially accommodated in the second reclaiming recess 21e of the second main bar 21. In other words, the material of the third conducting part 23 is partially taken from the second reclaiming recess 21e of the second main bar 21, so as to avoid taking the material from the direction away from the second main bar 21, and the advantage of reducing the amount of waste material is achieved. The amount of the material of the second reclaiming recess 21e taken by the third conducting part 23 is not limited to the present embodiment and is adjustable according to practical requirements. In an embodiment, when the second linking bus bar 2 is in the plane structure status, the fourth main bar side 21d of the second main bar 21 is a continuous side without a recess, and the third conducting part 23 is disposed apart from and neighboring to the fourth main bar side 21d of the second main bar 21, but not limited thereto.

As shown in FIG. 2, the first conducting part 13 of the first linking bus bar 1 and the third conducting part 23 of the second linking bus bar 2 are corresponding to each other, and a gap is formed therebetween. The gap is configured for allowing a rack bus bar (not shown) to be clamped therein, but not limited thereto, so that the bus bar assembly 200 of the present disclosure is electrically coupled with the rack bus bar, and the rack bus bar is able to transmit and distribute electric power to electronic equipment (i.e., loading). The first conducting part 13 of the first linking bus bar 1 includes a plurality of first holes 13c. The third conducting part 23 of the second linking bus bar 2 includes a plurality of second holes 23c. The plurality of first holes 13c and the plurality of second holes 23c are for example but not limited to fixing holes configured for fixing the rack bus bar (not shown). In an embodiment, the first conducting part 13 of the first linking bus bar 1 and the third conducting part 23 of the second linking bus bar 2 are non-perforated plate structure, respectively. A clamping element of the rack bus bar (not shown) is fitted to a gap formed between the first conducting part 13 and the third conducting part 23 of the bus bar assembly 200, but not limited thereto.

As shown in FIG. 3, the plurality of second conducting parts 14 of the first linking bus bar 1 are linearly disposed along the first main bar side 11c of the first main bar 11. Any two neighboring second conducting parts 14 are apart from each other by a first specific distance. In other words, the distances between any two of the second conducting parts 14 are equal. The first specific distance is greater than the width of each of the fourth conducting parts 24 of the second linking bus bar 2, but not limited thereto. The plurality of fourth conducting parts 24 of the second linking bus bar 2 are linearly disposed along the third main bar side 21c of the second main bar 21. Any two neighboring fourth conducting parts 24 are apart from each other by a second specific distance. In other words, the distances between any two of the fourth conducting parts 24 are equal. The second specific distance is greater than the width of each of the second conducting parts 14 of the first linking bus bar 1, but not limited thereto. In an embodiment, the first specific distance is equal to the second specific distance, but not limited thereto.

As shown in FIG. 2, when the first linking bus bar 1 is correspondingly disposed on the second linking bus bar 2, the plurality of second conducting parts 14 of the first linking bus bar 1 and the plurality of fourth conducting parts 24 of the second linking bus bar 2 are linearly disposed on the same plane, and staggered with each other. In other words, each of the second conducting parts 14 is disposed adjacent to one of the fourth conducting parts 24, or disposed between two of the fourth conducting parts 24. Each of the fourth conducting parts 24 is disposed adjacent to one of the second conducting parts 14, or disposed between two of the second conducting parts 14.

Figure 8:
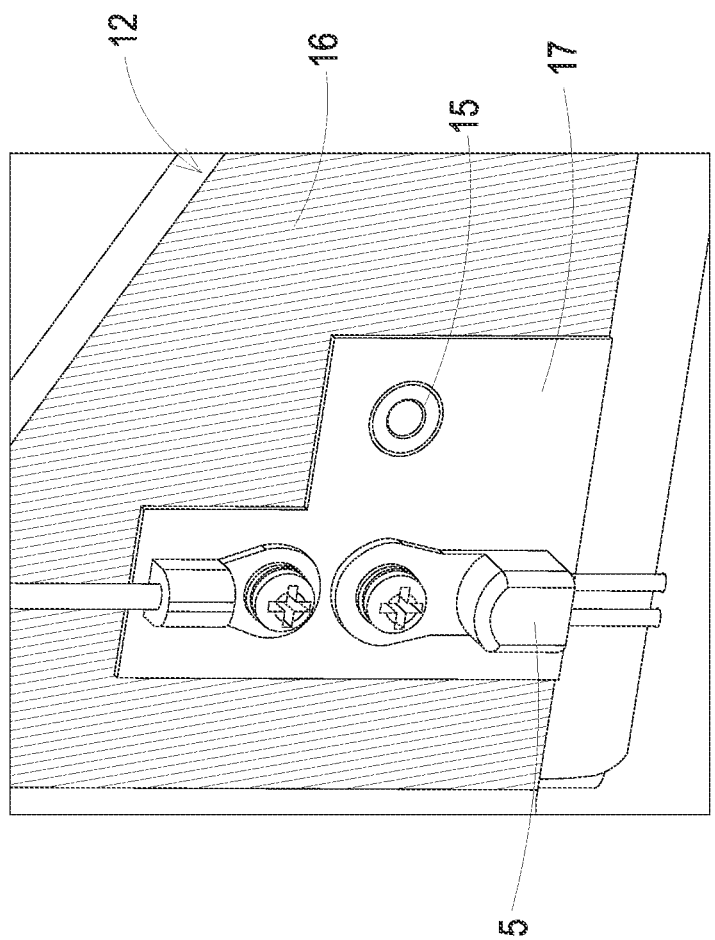
FIG. 8 is a partially enlarged schematic view illustrating a sensor of the first linking bus bar of the bus bar assembly of FIG. 2.

FIG. 8 is a partially enlarged schematic view illustrating a sensor of the first linking bus bar of the bus bar assembly of FIG. 2. As shown in FIGS. 2 and 8, in the present embodiment, the bus bar assembly 200 includes at least one sensor 5. The at least one sensor 5 is configured to detect one or plural operation statuses of the bus bar assembly 200, for example but not limited to detect the temperature or the voltage of the bus bar assembly 200. The at least one sensor 5 is at least one of a temperature sensor and a voltage sensor. The first linking bus bar 1 of the bus bar assembly 200 includes at least one first perforation 15. The at least one first perforation 15 is configured for allowing the at least one sensor 5 to be fixed and electrically coupled therein, but not limited thereto. The at least one first perforation 15 is disposed on the second bending part surface 12b of the first bending part 12 of the first linking bus bar 1, but not limited thereto. In an embodiment, the at least one sensor 5 is a voltage sensor, fixed in the at least one first perforation 15, and configured to detect the voltage of the bus bar assembly 200, but not limited thereto. In an embodiment, the at least one sensor 5 is a Negative Temperature Coefficient thermistor sensor (NTC thermistor sensor), fixed in the at least one first perforation 15, and configured to detect the temperature status of the bus bar assembly 200, but not limited thereto. In an embodiment, the at least one first perforation 15 is configured for allowing a sensor, an electronic device or an electronic component to be fixed on the bus bar assembly 200 according to practical requirements. Due to the disposing of the at least one sensor 5, the voltage and the temperature status of the bus bar assembly 200 is obtained immediately, thereby whether the system is operating normally or not can be detected immediately and effectively.

As shown in FIG. 2, the second linking bus bar 2 includes at least one second perforation 25. The at least one second perforation 25 is configured for allowing the at least one sensor 5 to be fixed and electrically coupled therein, but not limited thereto. The at least one second perforation 25 is disposed on the fourth bending part surface 22b of the second bending part 22 of the second linking bus bar 2, but not limited thereto. The embodiment of the at least one sensor 5 being fixed to the at least one second perforation 25 is similar to the above-mentioned embodiment of the at least one sensor 5 being fixed to the at least one first perforations 15, and aren't redundantly described herein.

As shown in FIGS. 2 and 8, in the present embodiment, the first linking bus bar 1 includes a first insulation coating 16. The first insulation coating 16 is coated on the first main bar 11 and the first bending part 12, and configured for providing the isolating protection to the first main bar 11 and the first bending part 12. The second linking bus bar 2 includes a second insulation coating 26. The second insulation coating 26 is coated on the second main bar 21 and the second bending part 22, and configured for providing the isolating protection to the second main bar 21 and the second bending part 22. Due to the first insulation coating 16 and the second insulation coating 26, short circuit is avoided.

As shown in FIGS. 2 and 8, in the present embodiment, the first bending part 12 of the first linking bus bar 1 includes a first uncoated zone 17. The first insulation coating 16 is not coated on the first uncoated zone 17 of the first bending part 12. The at least one first perforation 15 is disposed on the first uncoated zone 17. When the at least one sensor 5 is fixed to the at least one first perforation 15, the at least one sensor 5 is electrically coupled with the first bending part 12 through the first uncoated zone 17, so that the detecting function of the at least one sensor 5 is performed. The second bending part 22 of the second linking bus bar 2 includes a second uncoated zone 27. The second insulation coating 26 is not coated on the second uncoated zone 27 of the second bending part 22. The at least one second perforation 25 is disposed on the second uncoated zone 27. When the at least one sensor 5 is fixed to the at least one second perforation 25, the at least one sensor 5 is electrically coupled with the second bending part 22 through the second uncoated zone 27, so that the detecting function of the at least one sensor 5 is performed. In some embodiments, one or plural uncoated zones are selectively disposed on the first linking bus bar 1 and the second linking bus bar 2, and one or plural perforations are selectively disposed on uncoated zones. The arrangements of the uncoated zones and the perforations are not limited to the above-mentioned embodiments and are adjustable according to practical requirements.

Figure 9:
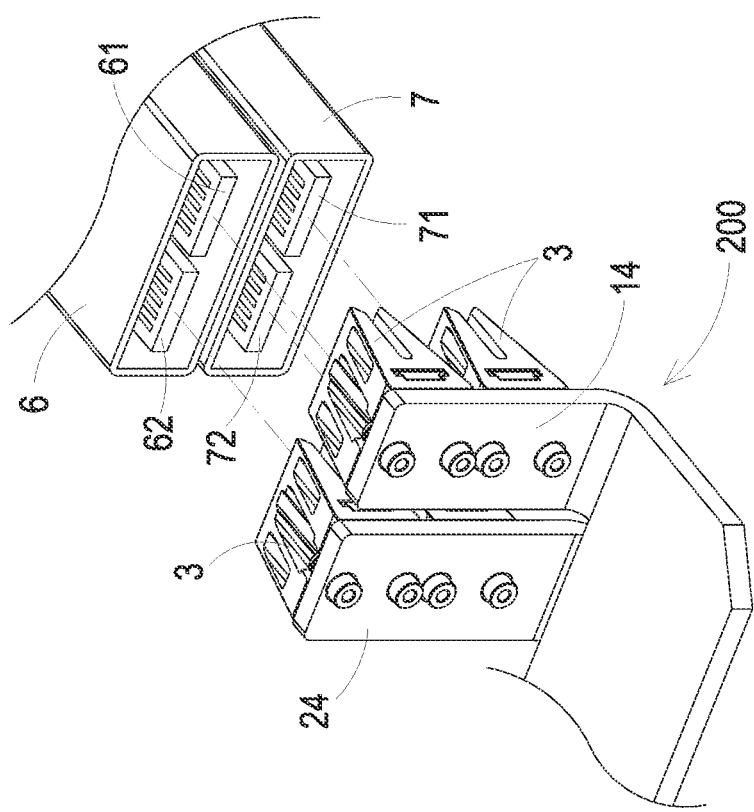
FIG. 9 is a partially enlarged schematic view illustrating a plurality of the power connectors of the bus bar assembly of FIG. 2 respectively connected to a battery unit and a power supply unit.
Figure 10:
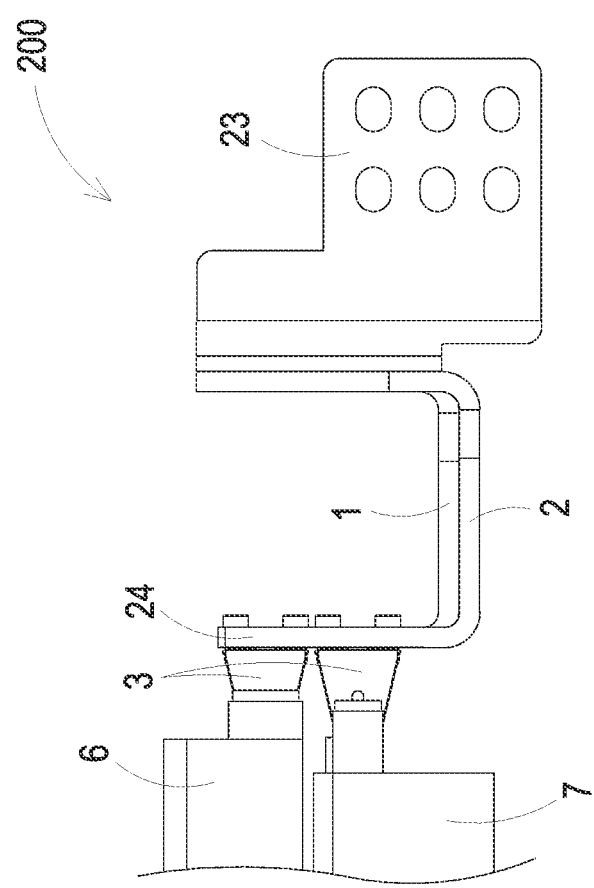
FIG. 10 is a side schematic view illustrating a plurality of the power connectors of the bus bar assembly of FIG. 2 respectively connected to the battery unit and the power supply unit.

FIG. 9 is a partially enlarged schematic view illustrating a plurality of the power connectors of the bus bar assembly of FIG. 2 respectively connected to a battery unit and a power supply unit, and FIG. 10 is a side schematic view illustrating a plurality of the power connectors of the bus bar assembly of FIG. 2 respectively connected to the battery unit and the power supply unit. As shown in FIGS. 2, 9 and 10, the plurality of power connectors 3 are configured to electrically couple with at least one of a power supply unit 6 and a battery unit 7, respectively. The power supply unit 6 is configured for outputting electric power, and includes a first power output terminal 61 and a second power output terminal 62. The first power output terminal 61 of the power supply unit 6 is pluggably connected to the power connector 3 disposed on the second conducting part 14 of the first linking bus bar 1. The second power output terminal 62 of the power supply unit 6 is pluggably connected to the power connector 3 disposed on the fourth conducting part 24 of the second linking bus bar 2. The battery unit 7 is configured for receiving, storing and outputting electric power, and includes a first battery terminal 71 and a second battery terminal 72. The first battery terminal 71 of the battery unit 7 is pluggably connected to the power connector 3 disposed on the second conducting part 14 of the first linking bus bar 1. The second battery terminal 72 of the battery unit 7 is pluggably connected to the power connector 3 disposed on the fourth conducting part 24 of the second linking bus bar 2. In the embodiment, a plurality of electrical connectors 3 are electrically connected to a power supply unit 6 and a battery unit 7 as an example for description, but not limited thereto. In an embodiment, the arrangements of the power supply unit 6 and the battery unit 7 are adjustable according to practical requirements. For example, the positions of the power supply unit 6 and the battery unit 7 are interchangeable, but not limited thereto.

As shown in FIG. 2, each of the second conducting parts 14 of the first linking bus bar 1 is provided with two power connectors 3, respectively. As shown in FIGS. 9 and 10, the two power connectors 3 disposed on the single second conducting part 14 are electrically coupled with the first power output terminal 61 of the power supply unit 6 and the first battery terminal 71 of the battery unit 7, respectively. As shown in FIG. 2, each of the fourth conducting parts 24 of the second linking bus bar 2 is provided with two power connectors 3, respectively. As shown in FIGS. 9 and 10, the two power connectors 3 disposed on the single fourth conducting part 24 are electrically coupled with the second power output terminal 62 of the power supply unit 6 and the second battery terminal 72 of the battery unit 7, respectively. By utilizing the above configuration, the power supply unit 6 can realize the output of electric energy through the bus bar assembly 200, and the battery unit 7 can also realize the output and input of electric energy through the bus bar assembly 200. When the power supply unit 6 supplies electric energy normally, the power supply units 6 outputs electric energy through the first conducting part 13 and the third conducting part 23 of the bus bar assembly 200, and charges the battery unit 7 through the second conducting part 14 and the fourth conducting part 24 of the bus bar assembly 200 at the same time. On the contrary, when the power supply unit 6 is abnormal, the battery unit 7 outputs electric energy through the first conducting part 13 and the third conducting part 23 of bus bar assembly 200 directly. By comparing with the bus bar assembly of the prior art having only one power output path, the bus bar assembly 200 of the present embodiment further provides another power transmission path, so that the bus bar assembly 200 can be electrically coupled with the power supply unit 6 and the battery unit 7 at the same time. Even if the power supply unit 6 is abnormal, the battery unit 7 can output electric energy continuously, therefore, the risk of power failure is reduced, the additional space for configuring the connection paths of the battery unit 7 is saved, and the cost is reduced.

From the above descriptions, the present disclosure provides a bus bar assembly. Since the bus bar assembly of the present disclosure is integrally formed into one piece structure by bending, the contact impedance is reduced, the power transmission efficiency is enhanced, and the amount of waste material is reduced. The bus bar assembly of the present disclosure includes at least one sensor for detecting the voltage and temperature status thereof, so that whether the system is operating normally or not can be detected immediately and effectively. Moreover, the bus bar assembly of the present disclosure further provides another power transmission path for connecting the battery unit, therefore, the risk of power failure is reduced, the additional space for configuring the connection paths of the battery unit is saved, and the cost is reduced.

While the disclosure has been described in terms of what is presently considered to be the most practical and preferred embodiments, it is to be understood that the disclosure needs not be limited to the disclosed embodiment.

What is claimed is:

1. A bus bar assembly comprising:
   a first linking bus bar comprising a first main bar, a first bending part and a first conducting part, wherein the first main bar has a first main bar side and a second main bar side which are opposite to each other, wherein the first bending part is in connection between the second main bar side of the first main bar and the first conducting part, wherein the first main bar, the first bending part and the first conducting part are formed by bending from each other, wherein the first bending part comprises a first main body and a first connection segment, and the first connection segment is a deformed area that in connection between the first main body and the first main bar, wherein the first conducting part comprises a second main body and a second connection segment, and the second connection segment is a deformed area that in connection between the second main body and the first bending part;
   a second linking bus bar disposed corresponding to and isolated from the first linking bus bar, and comprising a second main bar, a second bending part and a third conducting part, wherein the second main bar has a third main bar side and a fourth main bar side which are opposite to each other, wherein the second bending part is in connection between the fourth main bar side of the second main bar and the third conducting part, wherein the second main bar, the second bending part and the third conducting part are formed by bending from each other, wherein the second bending part comprises a third main body and a third connection segment, the third connection segment is a deformed area that in connection between the third main body and the second main bar, wherein the third conducting part comprises a fourth main body and a fourth connection segment, and the fourth connection segment is a deformed area that in connection between the fourth main body and the second bending part; and a plurality of power connectors electrically coupled with the first main bar and the second main bar, respectively.

2. The bus bar assembly according to claim 1, wherein the first linking bus bar is integrally formed into one piece structure, wherein the second linking bus bar is integrally formed into one piece structure.

3. The bus bar assembly according to claim 1, wherein the first main bar, the first bending part and the first conducting part are disposed perpendicular to each other, wherein the second main bar, the second bending part and the third conducting part are disposed perpendicular to each other.

4. The bus bar assembly according to claim 1, wherein the first bending part has a first bending part side and a second bending part side, the first bending part side and the second bending part side are two neighboring sides of the first bending part, wherein the first conducting part has a first conducting part side, the first conducting part side is located on one side of the first conducting part, wherein the second main bar side of the first main bar is in connection with the first bending part side of the first bending part, and the second bending part side of the first bending part is in connection with the first conducting part side of the first conducting part.

5. The bus bar assembly according to claim 1, wherein the first linking bus bar comprises a plurality of second conducting parts, wherein the plurality of second conducting parts are in connection with the first main bar side of the first main bar, respectively, wherein the second linking bus bar comprises a plurality of fourth conducting parts, wherein the plurality of fourth conducting parts are in connection with the third main bar side of the second main bar, respectively, wherein the second bending part has a third bending part side and a fourth bending part side, the third bending part side and the fourth bending part side are two neighboring sides of the second bending part, wherein the third conducting part has a second conducting part side, the second conducting part side is located on one side of the third conducting part, wherein the fourth main bar side of the second main bar is in connection with the third bending part side of the second bending part, and the fourth bending part side of the second bending part is in connection with the second conducting part side of the third conducting part.

6. The bus bar assembly according to claim 5, wherein the first main bar has a first main bar surface and a second main bar surface, and the first main bar surface is opposite to the second main bar surface, wherein the first bending part has a first bending part surface and a second bending part surface, and the first bending part surface is opposite to the second bending part surface, wherein the first conducting part has a first conducting part surface and a second conducting part surface, and the first conducting part surface is opposite to the second conducting part surface, wherein the first bending part surface of the first bending part is bended from coplanar with the first main bar surface to perpendicular to the first main bar surface, wherein the second conducting part surface of the first conducting part is bended from coplanar with the second bending part surface to perpendicular to the second bending part surface, wherein the plurality of second conducting parts have a fifth conducting part surface, respectively, wherein the fifth conducting part surfaces of the plurality of second conducting parts are bended from coplanar with the first main bar surface to perpendicular to the first main bar surface.

7. The bus bar assembly according to claim 5, wherein the second main bar has a third main bar surface and a fourth main bar surface, the third main bar surface is opposite to the fourth main bar surface, wherein the second bending part has a third bending part surface and a fourth bending part surface, and the third bending part surface is opposite to the fourth bending part surface, wherein the third conducting part has a third conducting part surface and a fourth conducting part surface, and the third conducting part surface is opposite to the fourth conducting part surface, wherein the third bending part surface of the second bending part is bended from coplanar with the third main bar surface to perpendicular to the third main bar surface, wherein the fourth conducting part surface of the third conducting part is bended from coplanar with the fourth bending part surface to perpendicular to the fourth bending part surface, wherein the plurality of fourth conducting parts have a sixth conducting part surface, respectively, wherein the sixth conducting part surfaces of the plurality of fourth conducting part are bended from coplanar with the third main bar surface to perpendicular to the third main bar surface.

8. The bus bar assembly according to claim 5, wherein the plurality of second conducting parts and the plurality of fourth conducting parts are staggered with each other, wherein the distances between any two of the second conducting parts are equal, and the distances between any two of the fourth conducting parts are equal.

9. The bus bar assembly according to claim 1, further comprising at least one sensor and at least one perforation, wherein the at least one perforation is disposed on at least one of the first linking bus bar and the second linking bus bar, wherein the at least one perforation is configured for allowing the at least one sensor to be fixed and electrically coupled therein.

10. The bus bar assembly according to claim 9, wherein the at least one sensor is at least one of a temperature sensor or a voltage sensor.

11. The bus bar assembly according to claim 9, wherein the first linking bus bar comprises a first insulation coating, and the first insulation coating is coated on the first main bar and the first bending part, wherein the second linking bus bar comprises a second insulation coating, and the second insulation coating is coated on the second main bar and the second bending part.

12. The bus bar assembly according to claim 11, further comprising at least one uncoated zone, wherein the at least one uncoated zone is disposed on the at least one of the first bending part and the second bending part, and the at least one perforation is disposed on the at least one uncoated zone.

13. The bus bar assembly according to claim 5, wherein the plurality of power connectors are configured to electrically couple with at least one of a power supply unit and a battery unit, respectively, wherein the at least one power supply unit is configured for outputting electric energy, and comprises a first power output terminal and a second power output terminal, wherein the first power output terminal is connected to the power connector disposed on the second conducting part, and the second power output terminal is connected to the power connector disposed on the fourth conducting part, wherein the battery unit is configured for receiving, storing and outputting electric energy, and comprises a first battery terminal and a second battery terminal, wherein the first battery terminal is connected to the power connector disposed on the second conducting part, and the second battery terminal is connected to the power connector disposed on the fourth conducting part.

14. The bus bar assembly according to claim 13, wherein each of the second conducting parts and each of the fourth conducting parts are provided with two power connectors, respectively, wherein the two power connectors disposed on the single second conducting part are electrically coupled with the first power output terminal of the power supply unit and the first battery terminal of the battery unit, respectively, wherein the two power connectors disposed on the single fourth conducting part are electrically coupled with the second power output terminal of the power supply unit and the second battery terminal of the battery unit, respectively.

15. The bus bar assembly according to claim 1, further comprising an insulation member, wherein the insulation member is disposed between the first linking bus bar and the second linking bus bar.

16. The bus bar assembly according to claim 1, further comprising at least one hole, wherein the at least one hole is disposed on at least one of the first conducting part and the third conducting part, and configured for allowing a rack bus bar to be fixed.

17. The bus bar assembly according to claim 1, wherein the first bending part is a triangular structure, and the second bending part is a triangular structure.

* * * * *